Patented Feb. 27, 1951

2,543,511

UNITED STATES PATENT OFFICE 2,543,511

PREPARATION OF DIBORANE

Hermann I. Schlesinger, Chicago, Ill., and Herbert C. Brown, Detroit, Mich., assignors to the United States of America as represented by the United States Atomic Energy Commission No Drawing. Application May 9, 1946, Serial No. 668,466

17 Claims. (Cl. 23—204)

This invention relates to the preparation of compounds of boron and hydrogen such as diborane, $B_2H_6$.

Hitherto, diborane has been prepared either by the hydrolysis of magnesium boride or by the reaction of boron halide vapor and hydrogen in a glow discharge in vacuo, thereby forming an intermediate product which disproportionates under heating to yield diborane. The hydrolysis of magnesium boride is undesirable for several reasons, for example, the process is quite complex, the yields of diborane which are obtained are small, and the process cannot be efficiently adapted for large scale production. The conventional glow discharge method has the disadvantages of inconvenience and waste of liquid nitrogen.

One object of the present invention, then, is to provide an improved process for the preparation of boron hydrides, and particularly diborane.

Another object of the present invention is to provide a convenient and efficient method of preparing boron hydrides, and particularly diborane, on a large scale and in an efficient and economic manner.

Other objects of the present invention will be apparent from the following description, taken in connection with the appended claims.

In accordance with the present invention it has been found that metal borohydrides, such as alkali and alkaline earth metal borohydrides, alkali and alkaline earth metal mono-, di-, and tri-alkyl borohydrides having the general formula $M[H_nB(R)_{4-n}]_m$, and alkali and alkaline earth metal mono-, di-, and tri-alkoxy borohydrides having the general formula $$M[H_nB(OR)_{4-n}]_m$$

react with halides of boron to produce compounds of boron and hydrogen, such as diborane. In the above formulae the letter M denotes an alkali or alkaline earth metal, R represents an organic radical in which the linkage of the R radical to the other radicals indicated in the formulae is through a carbon atom, the letters $n$ and $m$ in the above formulae are small whole numbers, $m$ being equal to the valence of the metal M and $n$ a number from 1 to 3. If desired, ether may be added to the reactants, or an ether complex of the boron halide may be used to moderate the reaction, decrease the reaction time, and increase the yield. The reaction probably proceeds in accordance with the following representative equations:

(1) $6NaBH(OCH_3)_3 + 8(BF_3 \cdot C_2H_5OC_2H_5) \rightarrow$
$6B(OCH_3)_3 + 6NaBF_4 + B_2H_6 + 8(C_2H_5)_2O$ (2) $3NaBH_4 + 4(BF_3 \cdot C_2H_5OC_2H_5) \rightarrow$
$3NaBF_4 + 2B_2H_6 + 4(C_2H_5)_2O$ In carrying out the invention, the reactants, preferably in stoichiometric proportions or with an excess of boron halide or boron halide-ether complex, are introduced into a suitable reaction vessel such as a reactor provided with an agitator and a cold finger reflux condenser. Means are generally provided for the introduction of a nonreactive gas, such as nitrogen, into the reactor in order to establish an essentially inert atmosphere.

The reaction is suitably conducted between 0° C. and 100° C. While the reaction may be carried out satisfactorily at room temperature, it has been found that the reaction is accelerated by maintaining the reactor at a temperature substantially above room temperature, and preferably from about 50° C. to about 75° C. The reactor is preferably heated in an even manner, such as, for example, by an oil bath surrounding the lower portion of the reactor and maintained at the desired temperature by suitable heating means. It has also been found that the reaction time may be substantially shortened by agitating the mixture during the reaction. In general, it has been found that the more vigorous the agitation the shorter is the time required for substantial completion of the reaction.

The process may be conducted batchwise by introducing the metal borohydride and boron halide in the desired amount into the reactor and heating to a suitable temperature such as, for example, 60° C. while the contents of the reactor are being agitated. The reaction is permitted to continue until the desired yield of diborane has been obtained. Usually the yield obtainable is substantially quantitative.

It has been found that the reaction between the metal borohydride and the boron halide may be accelerated by the use of an organic solvent for the boron halide. The boron halide may be dissolved by the organic solvent either before or after the introduction of the boron into the reactor. Organic solvents that have been used for dissolving the boron halide include dimethyl ether, diethyl ether, dibutyl ether and dioxane. Diethyl ether has been found to be particularly suitable for use in the process. Ether may be added to the borohydride, if desired, in order to moderate the reaction and facilitate control of the flow rate. In general, the use of ether will increase the yield of diborane and speed up the reaction.

Inasmuch as diborane reacts violently in the presence of oxygen, it is necessary that the process be carried out substantially in the absence of air, for example, in vacuum or in an inert atmosphere. The reaction vessel may be evacuated by conventional evacuating means such as, for example, a mechanical vacuum pump, or the reactor may be flushed with an inert gas, such as nitrogen, helium, neon, argon, or the like, prior to the introduction of the reactants.

The following are specific examples of the process embodying the invention. These examples are given by way of illustration and not limitation, it being understood that many changes and modifications may be made without departing from the spirit of the invention or the scope of the appended claims.

Example 1

A one liter, three neck flask was fitted with a mercury sealed stirrer, a dropping funnel containing an inlet for pure nitrogen, and a cold finger (—80° C.) reflux condenser. The top of the condenser led to a trap immersed in liquid nitrogen and then into a high vacuum apparatus. In the flask was placed 218 grams (1.70 moles) of sodium trimethoxy borohydride and in the dropping funnel was placed 322 grams (2.27 moles) of boron trifluoride etherate. The apparatus was then flushed with pure, dry nitrogen to sweep out all air and moisture. Next, the ethyl ether-boron trifluoride was introduced into the flask through the dropping funnel as rapidly as possible over a period of 10 to 15 minutes. After the addition of the boron trifluoride etherate the mixture was stirred vigorously by the agitator and a slow stream of nitrogen was kept flowing through the apparatus. After the initial reaction had subsided the flask was gradually warmed to 60° C. by means of an oil bath. The gaseous diborane was removed from the reactor by the slow stream of nitrogen passing through the system, and the resulting gas mixture was cooled by indirect contact with liquid nitrogen to condense the diborane. Between 5 and 6 liters of pure diborane were obtained, giving a yield of diborane of approximately 80 per cent to 90 per cent of the theoretical yield.

Example 2

Approximately 2.54 grams of 85 per cent pure sodium borohydride (0.057 mole) were placed in an apparatus similar to that used in Example 1. The apparatus was then carefully swept with dry nitrogen to remove air and 25.38 grams (0.179 mole) of boron trifluoride etherate was added to the sodium borohydride, through a dropping funnel over a period of 3 minutes while the mixture was being stirred. While continuing the agitation of the reactants, the flask was immersed in an oil bath and the temperature of the oil bath was brought up to 60° C. during a period of 40 minutes and maintained there for a period of three hours. After this heating the bath was lowered and the apparatus again swept out for one-half hour with nitrogen. The gaseous material was removed from the reactor by the slow stream of nitrogen passing through the system, and the resulting gas mixture was cooled by indirect contact with liquid nitrogen to condense the diborane and less volatile materials. In order to obtain pure diborane the condensed material was fractionated through traps at —90° C., —145° C. and pure diborane was collected at —195° C. The material in the —90° C. and —145° C. traps was fractionated three times until pure diborane was obtained in the amount of 0.6 gram (0.022 mole) thus giving a yield of 56 per cent of the theoretical yield. It was found that the temperature of the oil bath may be varied from 60° C. to 100° C. without appreciable effect on the yield.

Although we have described and illustrated the above invention with particular reference to sodium borohydride and sodium trimethoxy borohydride other compounds such as, for example, lithium borohydride, potassium borohydride, magnesium borohydride, sodium triethyl borohydride, sodium trimethyl borohydride, lithium trimethyl borohydride, potassium trimethyl borohydride, sodium triethoxy borohydride, lithium trimethoxy, borohydride, potassium trimethoxy borohydride, are equally useful in this process.

The above detailed descriptions are given for purposes of illustration and it is to be understood that the specific details thereof are not intended as limitations upon the scope of the invention, which is to be limited only by the scope of the following claims.

What is claimed is:

1. A process of preparing diborane which comprises reacting a borohydride of an alkali metal and a boron halide.

2. A process of preparing diborane which comprises reacting a borohydride of an alkaline earth metal and a boron halide.

3. A process of preparing diborane which comprises subjecting an alkali metal alkoxy borohydride to the action of boron halide.

4. A process of preparing diborane which comprises subjecting an alkaline earth metal alkoxy borohydride to the action of boron halide.

5. A process of preparing diborane which comprises reacting a borohydride of an alkali metal and boron trifluoride.

6. A process of preparing diborane which comprises subjecting an alkali metal alkoxy borohydride to the action of boron trifluoride.

7. A process for the production of diborane which comprises reacting a metal borohydride with a boron halide in the presence of an organic solvent.

8. A process for the production of diborane which comprises reacting an alkali metal borohydride with a boron halide in the presence of an ether.

9. A process for the production of diborane which comprises reacting an alkaline earth metal borohydride with a boron halide in the presence of an ether.

10. A process for the production of diborane which comprises reacting an alkali metal alkoxy borohydride with a boron halide in the presence of an ether.

11. A process for the production of diborane which comprises reacting an alkaline earth metal alkoxy borohydride with a boron halide in the presence of an ether.

12. A process for the production of diborane which comprises subjecting sodium borohydride to the action of a boron trifluoride-ethyl ether complex.

13. A process for the production of diborane which comprises subjecting sodium trimethoxy borohydride to the action of a boron trifluoride-ethyl ether complex.

14. A process for the production of diborane which comprises reacting an alkali metal borohydride with a boron halide, and recovering the diborane produced.

15. A process for the production of diborane which comprises reacting an alkali metal borohydride with a boron halide in the presence of an organic solvent, and recovering the diborane produced.

16. A process for the production of diborane which comprises reacting lithium borohydride with boron fluoride, and recovering the diborane produced.

17. A process for the production of diborane which comprises reacting lithium borohydride with a boron halide in the presence of an ether, and recovering the diborane produced.

HERMANN I. SCHLESINGER.
HERBERT C. BROWN.

No references cited.